United States Patent

Katayose et al.

[11] 3,977,487
[45] Aug. 31, 1976

[54] VEHICLE STEERING SYSTEM

[75] Inventors: Shinji Katayose, Yokohama; Hiromichi Uchiyama, Tokyo; Shigeru Tanisawa; Mitsuharu Hamada, both of Yokohama, all of Japan

[73] Assignee: Nissan Motor Co., Ltd., Yokohama, Japan

[22] Filed: Apr. 21, 1975

[21] Appl. No.: 569,615

[30] Foreign Application Priority Data
Apr. 27, 1974 Japan.................. 49-48146

[52] U.S. Cl............... 180/79; 104/244.1; 104/247
[51] Int. Cl.²........................... B62D 1/24
[58] Field of Search ........... 180/79; 104/244.1, 245, 104/247

[56] References Cited
UNITED STATES PATENTS

| | | | |
|---|---|---|---|
| 2,090,409 | 8/1937 | Vaszin | 104/247 |
| 3,363,584 | 1/1968 | Brush et al. | 104/247 |
| 3,393,762 | 7/1968 | Matson | 180/79 |
| 3,724,584 | 4/1973 | Varichon | 180/79 |

FOREIGN PATENTS OR APPLICATIONS

| | | | |
|---|---|---|---|
| 851,256 | 10/1960 | United Kingdom | 104/244.1 |
| 1,093,246 | 11/1967 | United Kingdom | 104/247 |

*Primary Examiner*—M. H. Wood, Jr.
*Assistant Examiner*—John A. Pekar

[57] ABSTRACT

A vehicle adapted to travel over roads under the control of a driver operating a vehicle wheel control system or to be automatically steered along a guideway has a pair of guideway contacting wheels that control the steering when extended to a predetermined portion to contact the guideway and when retracted permit steering by the driver. A hydraulic control cylinder has oppositely disposed pistons connected by axially aligned piston rods to the respective guideway contacting wheels and movable to extend and contact these wheels. A mechanical linkage system is disposed, respectively, between one piston rod and the vehicle wheel control system.

4 Claims, 5 Drawing Figures

VEHICLE STEERING SYSTEM

This invention relates to a vehicle for a transportation system in which the vehicle can travel on usual roads or on scheduled guideways.

Today, automobiles and railways greatly contribute to mass transportation. Automobiles provide a high level of mobility but cause considerable congestion. Whereas, railways offer intermediate range mass transportation but fail to provide a high level of mobility. Neither conventional automobiles nor railways systems appear to offer a solution to the problem of providing the desired degree of mobility without increasing congestion. An improved transportation system into which individually controlled vehicles may be integrated has been proposed to overcome the above problem. With this transportation system, the vehicles can travel either on usual roads as usual automobiles or on scheduled guideways like railways.

A principal object of the present invention is to provide an improved vehicle adapted for the transportation system which can integrate individually controlled vehicles into a guideway transportation system.

Another object of the present invention is to provide an improved steering system for the above vehicle by which the vehicle can be automatically steered along a guideway.

Still another object of the present invention is to provide an improved linkage means of the above steering system capable of connecting the steering wheel and steerable road wheels of the vehicle only when the vehicle travels on usual roads.

Other objects, features and advantages of the invention will be seen as the following description of a preferred embodiment thereof progresses, taken in conjunction with the drawings, in which.

Figure 1:
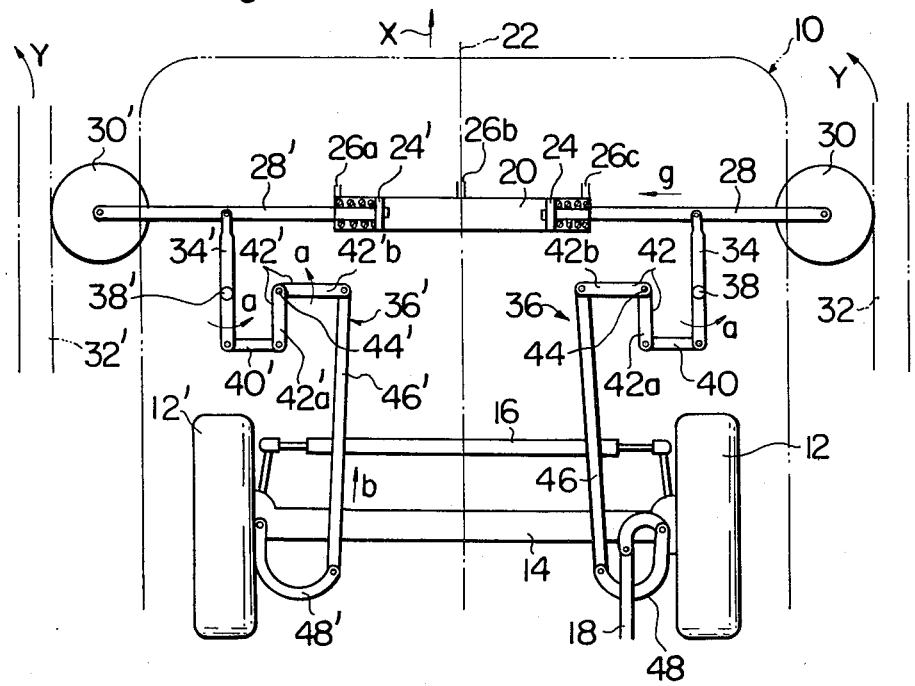
FIG. 1 is a top view of a steering system of a vehicle constructed in accordance with the invention.
Figure 2:
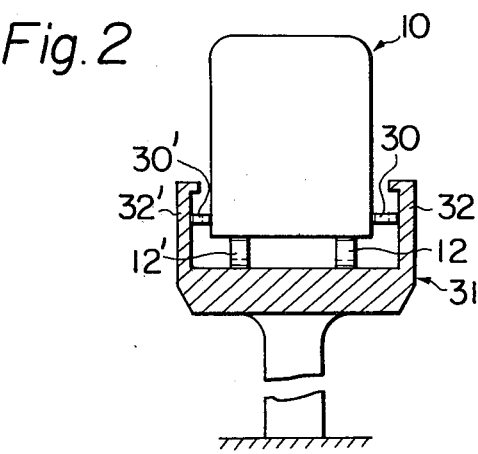
FIG. 2 is an elevational view showing a guideway system for guiding the vehicle therealong.

Referring now to FIGS. 1 and 2, there is shown a preferred embodiment of a steering system of the invention for use in a vehicle which can travel either on usual roads or on guideways provided with parallel guide walls on both sides thereof. In FIG. 1, the vehicle (no numeral) is provided with two front wheels 12 and 12' or two steerable road wheels at the front portion of the vehicle body indicated in phantom at 10. The vehicle is supported by the front wheels 12 and 12' through a front axle 14 as usual. The two front wheels 12 and 12' are interconnected by a tie rod 16. Indicated by reference numeral 18 is a drag link which is mechanically connected to the front wheels and a steering wheel (not shown) for turning the front wheels 12 and 12'.

At the front portion of the vehicle body 10, a hydraulic cylinder 20 is also fixedly disposed transversely with respect to the body centerline 22 or the longitudinal center axis of the vehicle body. First and second pistons 24 and 24' are disposed within the cylinder 20 and are maintained at predetermined positions by hydraulic fluid therebetween and springs (no numerals). The cylinder 20 is provided with ports 26a, 26b and 26c through which the hydraulic fluid is admitted and returned. The ports 26a, 26b and 26c are usually closed. A first piston rod 28 secured to the first piston 24 rotatably supports a first guide wheel or roller 30 at its extreme end portion. The guide roller 30 projects outside of the vehicle body 10 rightward with respect to the vehicle traveling direction indicated by the arrow X and rotatably contacts the inner surface of the vertical guide wall 32 of the guideway 31 as shown in FIG. 2.

A link 34 forming part of a first linkage 36 is connected at a mid-portion of the first piston rod 28 at one end portion thereof, and is rotatably mounted at its mid portion on a shaft 38 fastened to the vehicle body 10. The link 34 connects in turn to link 40. The link 40 is connected to a movable angular link 42 which is rotatably mounted at its angular portion on a shaft 44 fastened to the vehicle body 10. The angular link 42 is in turn connected to links 46 and 48 which mechanically connect the front wheels 12 and 12' to turn same.

A second piston rod 28' secured to the second piston 24' rotatably supports a second guide wheel of roller 30' at its extreme end portion. The second piston rod 28' is axially aligned with the first piston rod 28 and extends in the opposite direction. The guide roller 30' projects outside of the vehicle body 10 leftward with respect to the vehicle traveling direction indicated by the arrow X and rotatably contacts the inner surface of the other vertical guide wall 32' of the guideway 31 in FIG. 2. A second linkage 36' and the first linkage 36 are arranged symmetrically with respect to the vehicle center line 22. The second linkage 36' is formed with similar links 34', 40', 42', 46' and 48' to those of the first linkage 36.

Figure 3A:
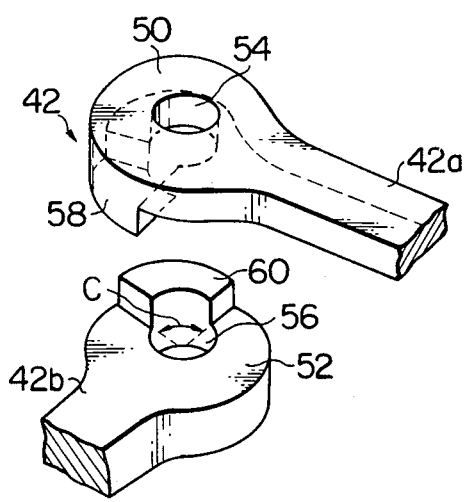
FIG. 3A is a perspective view illustrating the construction of a movable angular link in accordance with the principle of the invention which is employed in the steering system of FIG. 1.

FIG. 3A illustrates the detail construction of the above-mentioned angular linkage 42. The linkage 42 if formed by an elongate member 42a which is connected to the first piston rod 28, and another elongate member 42b which is connected to the front wheels 12 and 12'. One end portion 50 of the member 42a lies upon one end portion 52 of the member 42b, which are rotatably mounted on the shaft 44 (not shown) inserted through the respective openings 54 and 56. The elongate member 42a has a stop or a projection 58 having a substantially fan-shaped section formed on the plane surface of the end portion 50 which is adjacent to the end portion 52 of the member 42b. The elongate member 42b also has a stop or a projection 60 formed on the plane surface of its one end portion of the member 42a in a similar manner to the stop 58 of the elongate member 42a. The fan-shaped section of the projection 58 has a predetermined angle indicated by C which may be an angle of about 90°. The fan-shaped section of the projection 60 is also constructed to have a predetermined angle which may be an angle of about 90°.

Figure 3B:
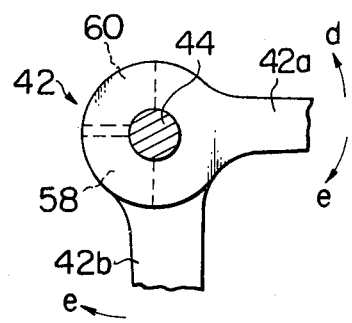
FIG. 3B is a plan view illustrating the action of the movable angular linkage of FIG. 3A.

As shown in FIG. 3B, both projections 58 and 60 are arranged and engaged with each other in such a manner that both projections form an approximate semicircle in section when both elongate member 42a and 42b are at approximately right angles. In this figure, when the elongate member 42a is rotated around the shaft 44 in a direction indicated by the arrow d, its projection 58 separates from the projection 60 of the elongate member 42b and therefore the elongate member 42a can move independently in the direction d. On the contrary, when the elongate member 42a is rotated around the shaft 44 in a direction indicated by the arrow e, its projection 58 engages at a side surface thereof with a side surface of the projection 60 of the elongate member 42b and therefore the elongate member 42b is forced to rotate around the shaft 44 in the direction e. The angular linkage 42' of the second linkage 36' is arranged and constructed in a similar manner to the above-mentioned angular link 42 of the first linkage 36 except that the elongate member 42a' of the second linkage 36' corresponds to the elongate member 42b of the first linkage 36, and the elongate member 42b' of the second linkage 36' corresponds to the elongate member 42a of the first linkage 36.

The operation of the steering system of the present invention as illustrated in FIGS. 1 and 2 will now be explained. When the guide walls 32 and 32' are curved in the left direction with respect to the vehicle traveling direction X as indicated by the arrow heads Y, the first guide roller 30 is pressed by the inner surface of the guide wall 32 in the direction indicated by the arrow g and therefore the second guide roller 30' is also pressed via the hydraulic fluid in the direction g to contact the inner surface of the other guide roller 32'. Accordingly, the links 34 and 34' are rotated around the shafts 38 and 38' in the directions indicated by arrows a, respectively. Thus, the elongate member 42a of the first linkage 36 is rotated by the link 40 about the shaft 44 in the direction (corresponding to the direction d in the FIG. 2B) where the elongate member 42b moves without effect on the elongate member 42b. Therefore the first piston rod 28 does not exert any force on the front wheels 12 and 12'. On the contrary, the elongate member 42a' of the second linkage 36' is rotated by the link 40' around the shaft 44' in the direction a to rotate the elongate member 42b' in the same direction a. This rotated elongate member 42b' forces the link 46' to move in a direction b and therefore the front wheels 12 and 12' are forced to turn and steer the vehicle in the direction Y.

When the guide walls 32 and 32' are curved in the right direction or the opposite direction of the direction Y with respect to the vehicle traveling direction X, the second guide roller 30' is pressed by the inner surface of the side wall 32' in the opposite direction to that of g and therefore the first guide roller 30 is also pressed in the opposite direction to that of g to contact with the inner surface of the other guide wall 32. Accordingly, the second piston rod 28' does not effect the front wheels while the front wheels 12 and 12' are turned in response to the movement of the first piston rod 28 to steer the vehicle in the opposite direction to that of Y with respect to the vehicle traveling direction X.

Figure 4:
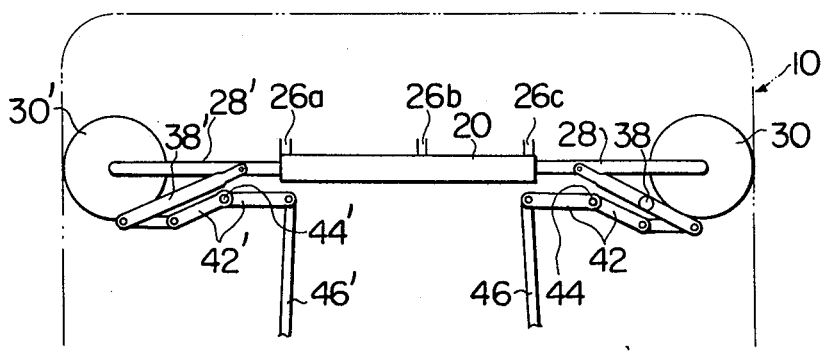
FIG. 4 is a top view similar to FIG. 1 but shows the state in which two guide rollers of the steering system are withdrawn inside of the vehicle body.

FIG. 4 illustrates a state of the first and second guide rollers 30 and 30' of the present steering control system when the vehicle travels on usual roads. In this figure, the guide rollers 30 and 30' are withdrawn into the vehicle body. This is accomplished by suitable pumping means (not shown) which pumping means discharges the hydraulic fluid through the port 26b and charges same through the ports 26a and 26c (shown in FIG. 1). When the guide rollers 30 and 30' are withdrawn into the vehicle body 10 as shown in FIG. 4, neither angular link 42 or 42' is effected by the first and second piston rods 28 and 28' and the front wheels 12 and 12'. Therefore, the vehicle can be driven on usual roads using the steering wheel without influence from the first and second linkages 36 and 36'.

What is claimed is:

1. A steering system of a vehicle capable of traveling on usual roads and on roads with parallelly extending two guide walls at both sides thereof, the vehicle having steerable road wheels movably carrying the vehicle body, the steering system comprising:
   a hydraulic cylinder secured to the front portion of the vehicle transversely with respect to the longitudinal center axis of the vehicle body, said cylinder being provided therein with first and second pistons having first and second piston rods, respectively, which are axially aligned and extend in the opposite direction to each other;
   first and second guide rollers respectively rotatably mounted on the first and second piston rods of said hydraulic cylinder at the respective ends of said rods opposite said pistons, said guide rollers being contactable with the inner surfaces of said two guide walls;
   said pistons defining, with said hydraulic cylinder, a chamber therebetween, the admission of hydraulic fluid to said chamber being effective to move the respective piston rods to a predetermined position wherein said guide rollers are in contact with the inner surfaces of said two guide walls and establishing a fluid communication between said pistons which permits said piston rods to move transversely relative to said predetermined position when said vehicle moves transversely relative to said guide walls;
   a first steering linkage selectively operatively mechanically connectable between said first piston rod and said steerable road wheels, said first steering linkage being arranged to establish mechanical connection between the first piston rod and the steerable road wheels to steer the vehicle in the right direction with respect to the longitudinal center axis of the vehicle body when said first piston rod moves outwardly transversely with respect to the vehicle body from said predetermined position thereof, and to interrupt the mechanical connection between the first piston rod and the steerable road wheels when the first piston rod moves inwardly from the predetermined position; and
   a second steering linkage selectively operatively mechanically connectable between said second piston rod and said steerable wheels, said second steering linkage being arranged to establish connection between the second piston rod and the steerable road wheel to steer the vehicle in the left direction with respect to the longitudinal axis of the vehicle body when said second piston rod moves outwardly transversely with respect to the vehicle body from said predetermined position thereof, and to interrupt the mechanical connection between the second piston rod and the steerable road wheels when the first piston rod moves inwardly from the predetermined position.

2. A system as claimed in claim 1, in which said first steering linkage includes a first movable angular link formed of a first elongate member and a second elongate member, said both elongate members being rotatably mounted on a first common shaft fastened to the vehicle body at their respective one end portions, the other end portion of said first elongate member mechanically connecting the first piston rod and the other end portion of said second elongate member mechanically connecting the steerable road wheels, said first and second elongate members having respective engageable stops at said respective one end portions for limiting their relative movements to each other in response to the movements of the first piston rod so that said first elongate member is freely moved with respect to said second elongate member when moved around the common shaft in a direction where the angle formed by said both elongate members increases beyond a predetermined value, and so that said first elongate member is moved in cooperation with said second elongate member when moved around the first common shaft in the reverse direction where said angle decreases to the predetermined value; and said second steering linkage includes a second movable angular link formed of a third elongate member and a fourth elongate member, said both elongate members being rotatably mounted on a second common shaft fastened to the vehicle body at their respective one end portions, the other end portion of said third elongate member mechanically connecting to the second piston rod and the other portions of said fourth elongate member mechanically connecting to the steerable road wheels, said third and fourth members having respective engageable stops at said respective one end portions for limiting their relative movements to each other in response to the movements of the second piston rod so that the third elongate member is freely moved with respect to said fourth elongate member when moved around the second common shaft in a direction where the angle formed by said both elongate members increases beyond the predetermined value, and so that said third elongate member is moved in cooperation with said fourth elongate member when moved around the second common shaft in the reverse direction where said angle is decreased to the predetermined value.

3. A system as claimed in claim 2, in which said one end portion of said first elongate member lies upon said one end portion of said second elongate member, and said one end portion of said fourth elongate member lies upon said one end portion of said third elongate member.

4. A system as claimed in claim 3, in which said stop of said one end portion of said first elongate member is a projection having a fan-shaped section which is formed on the plane surface thereof adjacent to said second elongate member, and said stop of said one end portion of said second elongate member is a projection having a fan-shaped section which is formed on the plane surface thereof adjacent said first elongate member, and said stop of said one end portion of said third elongate member is a projection having a fan-shaped section which is formed on the plane surface thereof adjacent to said fourth elongate member, and said stop of said one end portion of said fourth elongate member is a projection having the fan-shaped section which is formed on the plane surface thereof adjacent to said third elongate member.

* * * * *